United States Patent [19]

Pietsch

[11] 3,755,119

[45] Aug. 28, 1973

[54] ARTICLE ELECTROCOATED WITH ADHESIVELY BONDABLE ACRYLIC RESIN CONTAINING BIS-UREA

[75] Inventor: Gerhard Josef Pietsch, Stamford, Conn.

[73] Assignee: American Cyanamid Company, Stamford, Conn.

[22] Filed: Apr. 29, 1971

[21] Appl. No.: 138,834

[52] U.S. Cl. .............................................. 204/181
[51] Int. Cl. ......................... B01k 5/02, C23b 13/00
[58] Field of Search .................................... 204/181

[56] References Cited
UNITED STATES PATENTS 3,403,088   9/1968   Hart ................................. 204/181
3,471,388   10/1969  Koral ............................... 204/181

*Primary Examiner*—Howard S. Williams
*Attorney*—Evans Kahn

[57] ABSTRACT

There are provided both (1) a method for increasing the adhesiveness of electrodeposited acrylic resin coatings to epoxy or polyurethane adhesives which comprises incorporating into said acrylic resin either a bis-urea or an epoxy compound prior to electrodeposition and (2) the resultant coated articles.

3 Claims, No Drawings

ARTICLE ELECTROCOATED WITH ADHESIVELY BONDABLE ACRYLIC RESIN CONTAINING BIS-UREA

BACKGROUND OF THE INVENTION

The coating of various metallic articles of manufacture utilizing electrophoretic techniques has become more widely practiced in recent years. These techniques enable large articles to be more completely and uniformly coated than hand or automatic spraying, brushing, or dipping.

One of the deficiencies of coating by electrodeposition resides in the fact that acrylic resins coated by such a method are not susceptible to applications of normal adhesives. That is to say, electrodeposited acrylic resin coatings, when contacted with an adhesive material, such as an epoxy adhesive, for purposes of ultimately applying metal thereto, do not adequately adhere to the metal and therefore are not useful for many commercial applications. In a copending application, Ser. No. 872,353, filed on Oct. 29, 1969, now U.S. Pat. No. 3,619,399, granted Nov. 9, 1971, there is disclosed a process for effecting adhesion improvement between an electrodeposited acrylic resin coating and an adhesive, such as an epoxy adhesive, by first priming the acrylic coating with a polyamine. This procedure requires two operations, namely, the step of electrodeposition, followed by dipping into a polyamine so as to coat the electrodeposited coating. Consequently, it would be highly advantageous to reduce the two operations to one, thereby markedly reducing costs.

SUMMARY

It has now been found that adhesive bondability may be markedly increased in one step by initially incorporating into the acrylic resin prior to coating either a bis-urea or an epoxy resin.

DESCRIPTION OF THE INVENTION INCLUDING PREFERRED EMBODIMENTS

As mentioned above, our novel method comprises providing an acrylic resin coating composition containing an epoxy resin or a bis-urea prior to electrodeposition in order to render the coating more susceptible to bonding utilizing known adhesives.

The acrylic resin herein employed is a water-dispersible, non-gelled, polymeric material carrying an anionic charge.

It should be observed that it is not sufficient for the ionic, water-dispersible, non-gelled, acrylic resin to only possess the above characteristics, but the non-gelled, acrylic resin must, in addition thereto, also contain sufficient carboxyl groups so as to create an acid number of at least about 20 in the resultant resin. In addition to the carboxyl groups, the acrylic resin may contain such groups as alcoholic hydroxyl groups and amido groups which may also cross-link with a guanamine or melamine cross-linking agent which must also be used.

The purpose for having the electric charge on the water-dispersible, non-gelled, acrylic resin is so that it will migrate to the anode in an electrophoretic system. As will be apparent from the illustrative example set forth hereinbelow, the guanamine or malamine cross-linking agent moves to the electrode during deposition along with the charged polymeric acrylic material and both materials thereby become deposited thereon, the electrode, in most instances, being the metallic article which is to be coated.

After the deposition of the mixed polymeric material has been accomplished on the metal, the coated metal is then heat treated, preferably by baking, in order to accomplish the cross-linking between the guanamine or melamine and the acrylic resin containing the cross-linking sites that are heat reactive with the guanamine or melamine. As used in an electrodeposition process, the bath has a pH of between about 6 and 11, and preferably between about 7.1 and 9.

The anionic, water-dispersible, non-gelled, polymeric material used in the composition of the present invention may be any one of a plurality of acrylic resins which have reactive sites that are heat reactive with the substantially fully etherified tetramethylol guanamine or substantially fully etherified hexamethylol malamine and possess the other properties mentioned above. These reactive sites may be the carboxyl groups. Any available alcoholic hydroxyl groups and/or amide groups may also form a cross-linking site, the acrylic resin being the result of vinyl polymerization. The acrylic resins may be completely water-soluble or they may be substantially water-insoluble but capable of being dispersed in water. Sometimes it may be necessary to use appropriate surfactants to disperse the acrylic resins. The term "water-dispersible," therefore, is intended to encompass both the aqueous solutions as well as dispersions in which the acrylic resin may be suspended in the aqueous meium. The acrylic resin is generally used in combination with the malamine or guanamine in the form of an emulsion which can be prepared by incorporating an amine, such as diisopropanolamine, into the electrodeposition menstruum as is known in the art.

When the anionic acrylic resins are prepared and dispersed in water, the pH of the aqueous menstruum is advantageously adjusted to from 6 to 11 and, preferably, to a pH from about 7.1 to 9. This adjustment of the pH is usually accomplished on the anionic acrylic resin before the substantially fully etherified tetramethylol guanamine or substantially fully etherified hexamethylol melamine is added; and then, if necessary, the pH is readjusted to a point within the ranges set forth hereinabove.

The anionic, acrylic resins are prepared by vinyl polymerization and may be prepared in either an aqueous solution, organic solvent, and the like. All of these procedures are thoroughly well known in the art, and it is not deemed necessary to elaborate thereon.

The acrylic resins may be prepared by polymerizing polymerizable monomers such as acrylic acid, methacrylic acid, crotonic acid, $\beta$-benzoyl acrylic acid, fumaric acid, and maleic acid in the presence of other monomers which contain no carboxyl groups such as methyl acrylate, ethyl acrylate, propyl acrylate, butyl acrylate, octyl acrylate, decyl acrylate, lauryl acrylate, methyl methacrylate, ethyl methacrylate, butyl methacrylate, heptyl methacrylate, decyl methacrylate, propyl crotonate, butyl crotonate, nonyl crotonate, and the like. Still further, one can copolymerize the carboxy group containing monomer with such copolymerizable monomers as styrene, ortho-, meta-, or para-alkyl styrenes such as the o-, m-, or p-methyl, ethyl, propyl, and butyl styrenes, 2,4-dimethyl styrene, 2,3-dimethyl styrene, 2,5-dimethyl styrene, vinyl naphthenate, acrylonitrile, methacrylonitrile, halo ring or side chain styrenes such as α-chloro styrene, ortho-, meta-, or para-chloro styrenes, 2,4-dichloro styrene, 2,3-dichloro styrene, 2,5-dichloro styrene or the alkyl side chain styrenes such as α-methyl styrene, α-ethyl styrene, and equivalents of the same. Additionally, one can make use of such polymerizable vinyl monomers as acrylamide, methacrylamide, ethacrylamide, N-tertiary-butylacrylamide, and the like.

Alcoholic hydroxyl groups may be incorporated into the acrylic resin by using a polymerizable vinyl monomer which contains an alcoholic hydroxy group, such as the hydroxy alkyl esters of αβ-unsaturated monocarboxylic acids, e.g., the hydroxy alkyl esters of acrylic acid, methacrylic, ethacrylic, and chloro as well as the other chloro substituted acrylic acids. These esters may either have a primary or a secondary hydroxyl group. Illustrative of the types of compounds that are used to make the copolymers in the anionic, polymeric material are 2-hydroxyethyl acrylate, 2-hydroxy propyl acrylate, 3-hydroxy propyl acrylate, 2-hydroxyl butyl acrylate, 3-hydroxy butyl acrylate, 4-hydroxy-butyl acrylate, 8-hydroxy octyl acrylate, 2-hydroxy ethyl methacrylate, 5-hydroxy hexyl methacrylate, 6-hydroxy octyl methacrylate, 8-hydroxy octyl methacrylate, 10-hydroxy decyl methacrylate, 3-hydroxy propyl crotonate, 4-hydroxy amyl crotonate, 5-hydroxy amyl crotonate, 6-hydroxy hexyl crotonate, 7-hydroxy-heptyl crotonate, 10-hydroxy hexyl crotonate, and the like. These hydroxy esters may be used either singly, in combination with one another, or with other polymerizable vinyl monomers devoid of any alcoholic hydroxyl group including those set forth hereinabove. Additionally, one can make use of other hydroxyl-containing polymerizable vinyl monomers, such as methylolacrylamide, methylolmethacrylamide, and the like.

Among the amide group-containing monomers which may be used to incorporate amido groups into the anionic, water-dispersible, acrylic material used in the present invention are acrylamide, methacrylamide, ethacrylamide, and the like. These polymerizable acrylamides may be used to prepare anionic copolymeric materials useful in the present invention with the carboxyl group-containing monomers and/or any of the hydroxyl group-containing monomers or other copolymerizable monomers set forth hereinabove.

In order to illustrate the preparation of an anionic carboxyl group-containing polymer, the following example is set forth in which all parts are parts by weight, unless otherwise indicated.

CARBOXYL GROUP-CONTAINING ACRYLIC RESIN

Into a suitable reaction vessel equipped with stirrer, thermometer, and reflux condenser, there are introduced 10 parts of ethylamylketone and 45 parts of ethyl cellusolve. The charge is heated gradually to 90° C. After the mixture has reached 90° C., a mixture of 40 parts of butyl acrylate, 10 parts of acrylic acid, 20 parts of acrylonitrile, 15 parts of 2-hydroxy-ethyl acrylate, 2 parts of azobisisobutyronitrile, and 1 part of n-dodecyl mercaptan is added. After addition is completed, the mixture is kept at 90° C. for two hours. The resultant polymer solution (61.5 percent solids) has an acid number of 83.5, based on 100 percent solids.

Similar acrylic resins can be prepared containing hydroxy groups in addition to carboxy groups by the substitution of, or addition of, for example, β-hydroxyethyl methacrylate. Furthermore, the incorporation of acrylamide creates amide groups in the acrylic resin.

It is also within the scope of the present invention to incorporate various additives into the acrylic resins. For example, various dyes or pigments, e.g., $TiO_2$, $Fe_2O_3$; chromates; etc., can be added so that the coating which results from the electrodeposition process will be colored, e.g., white, red, etc.

The guanamines useful herein as the cross-linking agent are substantially pure alkylated tetramethylol guanamines or mixtures of various substantially fully etherified tetramethylol guanamines which contain at least 8 carbon atoms, exclusive of those three (3) carbon atoms in the triazine ring.

The substantially fully etherified tetramethylol guanamines may have anywhere from 2 alkoxymethyl groups to 4 alkoxymethyl groups, or any combination of 2–4 of the same or different alkoxymethyl groups, wherein said alkoxy radicals can possess from 1–4 carbon atoms, inclusive.

the guanamine compounds useful in our process are represented by the formula:

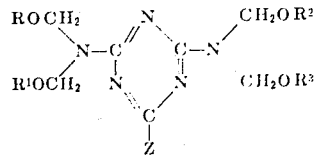

wherein R, $R^1$, $R^2$, and $R^3$ are the same or different alkyl radicals of 1–4 carbon atoms, inclusive, or hydrogen, at least two being an alkyl radical, and Z is hydrogen, an alkyl radical of 1–8 carbon atoms, inclusive, or an aryl radical.

Substantially fully etherified methylol guanamines are not considered to be resinous material since they are, as individual entities, non-polymeric compounds. They are, however, potential resin-forming compounds which can enter into chemical reaction or association with the anionic, water-dispersible, non-gelled acrylic resin when subjected to heat and particularly when subjected to heat under acidic conditions. The concept of the degree of alkylation on the average will be discussed herein in order that this concept may be more fully understood.

Theoretically, it is possible to methylolate guanamine fully, that is, to produce tetramethylol guanamine. However, frequently a composition purporting to be tetramethylol guanamine, when analyzed shows a fractional degree of methylolation. It is well recognized that fractional methylolation is not considered to be possible. As a consequence, when a composition containing on analysis a degree of methylolation of below 4.0, it has to be recognized that this is but an average degree of the methylolation of the guanamine compound and establishes logically that the aforementioned methylol composition is composed of a mixture of a preponderant amount of tetramethylol guanamine with comparatively minor amounts of trimethylol guanamine and perhaps insignificant amounts of such derivatives as dimethylol guanamine and even monomethylol guanamine. The same concept of averages is also applicable to the alkylation or etherification of the tetramethylol guanamine composition. There cannot be, based on present reasoning, a fractional alkylation; and as a consequence, when on analysis, a given composition shows that the degree of, for example, methylation is 3.7, it must be concluded that there is present in such a composition some combination of mono-methyl, dimethyl, trimethyl, and tetramethyl ethers. If a mixture of, e.g., methanol and ethanol is used in the alkylation, there may be present some monoethyl ether dimethyl ether of tetramethylol guanamine, some dimethyl ether monoethyl ether of tetramethylol guanamine, etc. Therefore, regardless of whether the reaction is with a sole alcohol or a mixture of alcohols, the resultant product is generally a mixture of substantially fully etherified tetramethylol guanamines which have 1-4 alkoxymethyl groups, on the average, and which may contain any one of the following compounds and in varying amounts depending on the degree of methylation and the degree of different alkylation. Included in that group of compounds are the folliwng: tetramethyl ethers of tetramethylol guanamines, dimethyl diethyl ethers of tetramethylol guanamines, trimethyl monoethyl ethers of tetramethylol guanamines, monomethyl triethyl ethers of tetramethylol quanamines, and the like including corresponding aceto, formo or propi-oguanamines, and the like.

While the above discussion has been directed primarily to monomeric guanamines, it should be understood that such materials as dimers and trimers of the above guanamine compounds may also be utilized, alone or in admixture with the specified guanamines.

As discussed above in regard to the quanamines useful herein, a substantially fully etherified hexamethylol melamine material may also be used in substantially pure form or as admixtures of various etherified hexamethylol melamines with one another.

When a mixture of substantially fully etherified hexamethylol melamines is used, the melamine should have at least 4, and preferably at least 5, alkoxymethyl groups on the average. The alkoxymethyl groups may include methoxymethyl, ethoxymethyl, propoxymethyl, or butoxymethyl groups or mixtures thereof.

The melamine cross-linking agents also are potential resin-forming compounds which enter into chemical reaction with the anionic, water-dispersible, non-gelled, acrylic resin when subjected to heat and particularly when subjected to heat under acidic conditions. The concept of the degree of methylation, or more broadly, alkylation on the average, will also be discussed here as above with the guanamine compounds.

Theoretically as with the guanamines, it is possible to methylolate melamine fully, that is, to produce hexamethylol melamine. However, frequently a composition purporting to be hexamethylol melamine, when analyzed shows a fractional degree of methylolation. It is well recognized that fractional methylolation is not considered to be possible. As a consequence, when a composition containing on analysis a degree of methylolation of 5.75, 5.80, or even 5.90, it has to be recognized that this is but an average degree of the methylolation of the melamine compound and establishes logically that the aforementioned methylol composition is composed of a mixture of a preponderant amount of hexamethylol melamine with comparatively minor amounts of pentamethylol melamine and perhaps insignificant amounts including traces of such derivatives as tetramethylol melamine and even trimethylol melamine, etc. The same concept of averages is also applicable to the alkylation or etherification of the hexamethylol melamine composition. There cannot be, based on present reasoning, a fractional alkylation; and as a consequence, when on analysis, after reaction with a mixture of methanol and ethanol, a given composition shows that the degree of methylation is 2.5 and the degree of ethylation is correspondingly about 3.5, it must be concluded that there is present, in such a composition, some dimethyl ether tetraethyl ether of hexamethylol melamine as well as some trimethyl ether triethyl ether of hexamethylol melamine. There may also be present some monoethyl ether pentamethyl ether of hexamethylol melamine, or even some tetramethyl ether diethyl ether of hexamethylol melamine, etc. Therefore, when the reaction is conducted with only methanol, the mixture of substantially fully etherified hexamethylol melamines may contain any one of the following compounds in varying amounts depending on the degree of methylation and the degree of different alkylation. Included in that group of compounds are the following: the hexamethyl ether of hexamethylol melamine, pentamethyl ethers of hexamethylol melamine, tetramethyl ethers of hexamethylol melamine, trimethyl ethers of hexamethylol melamine, dimethyl ethers of hexamethylol melamine, and monomethyl ethers of hexamethylol melamine. When propanols, including normal propanol as well as isopropanol, are used with, for example, methanol as the alkylating mixture, the following ethers may be present in the system or mixture: hexamethyl ethers of hexamethylol melamine, pentamethyl monopropyl ethers of hexamethylol melamine, tetramethyl dipropyl ethers of hexamethylol melamine, trimethyl tripropyl ethers of hexamethylol melamine, dimethyl tetrapropyl ethers of hexamethylol melamine, monomethyl pentapropyl ethers of hexamethylol melamine, and hexapropyl ethers of hexamethylol melamine. When the butanols are used, including normal butanol, secondary butanol, isobutanol, and tertiary butanol as the alkylating material, again with methanol, the blend of etherified hexamethylol melamines may include some or all of the following derivatives depending on the degree of methylation and the degree of butylation: hexamethyl ethers of hexamethylol melamine, pentamethyl monobutyl ethers of hexamethylol melamine, tetramethyl, dibutyl ethers of hexamethylol melamine, trimethyl tributyl ethers of hexamethylol melamine, dimethyl tetrabutyl ethers of hexamethylol melamine, monomethyl, pentabutyl ethers of hexamethylol melamine, and the hexabutyl ethers of hexamethylol melamine. In addition to dihetero alkylation of the hexamethylol melamine, one could prepare and utilize trihetero alkylated hexamethylol melamines and tetrahetero alkylated hexamethylol melamines, if desired; but the process for preparing such a trihetero alkylated or a tetrahetero alkylated material would present processing complications, and it has not been found that any advantage is to be gained by using such trihetero alkylated and tetrahetero alkylated and tetrahetero alkylated materials. As a consequence, the mono alkylated or dihetero alkylated hexamethylol melamines are preferred as the etherified hexamethylol melamines.

The adhesively, bondable acrylic coatings are generally prepared by blending the anionic, water-dispersible, non-gelled, acrylic resin with the melamine or guanamine, which acrylic resin is heat reactive with said melamine or guanamine cross-linking agents. The two components are blended in an aqueous solvent. The dispersion medium may consist of water alone or may contain additional solvents; but generally, water should be the preponderant component of the dispersion medium, and for economic reasons, other possible solvents that could be used with water are omitted unless they are designed to serve some special function.

Nonetheless, as stated above, the acrylic coatings are incapable of being adhesively bonded or united. Surprisingly, by modifying the aforementioned coating composition prior to electrodeposition, an adhesively bondable coating can be readily attained. This is accomplished by introducing either a commercially available epoxy resin, such as resorcinol diglycidyl ether or diglycidyl ether of bisphenol A, or any commercially available bis-urea compound of the structure:

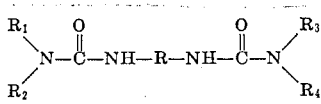

where R is lower alkylene or arylene; $R_1$, $R_2$, $R_3$, and $R_4$ are each hydrogen lower alkyl, or phenyl which can be the same or different.

Exemplary of the bis-ureas are 1,1'-ethylenediurea, 1,1'-o-phenylenediurea, 1,1'-(4-methyl-m-phenylene) diurea, 1,1'-(4-methyl-m-phenylene)-bis [3,3-diisopropylurea], 1,1'-(4-methyl-m-phenylene-bis [3,3-dimethylurea], 1,1'-trimethylene-bis ]3,3-diethylurea], 1,1'-tetramethylene-bis [3,3-diphenylurea], 1,1'-o-phenylene-bis [3,3-diisopropylurea], their equivalent isomers and homologs.

In general, either the epoxy resin or bis-urea compound added to the coating composition is incorporated in amounts ranging from about 1 percent to about 5 percent, and preferably from about 10 percent to 30 percent, based on the weight of the total resin solids of the coating bath composition.

The amount of the substantially fully etherified tetramethylol guanamine or substantially fully etherified hexamethylol melamine used in the present invention will be that amount sufficient to react with at least 5 percent of the reactive groups present in the acrylic resin and generally will vary between about 5 percent and about 40 percent, by weight, based on the total weight of cross-linking agent and the anionic, water-dispersible, non-gelled, acrylic resin which is heat reactive with said guanamine or melamine. Correspondingly, there will generally be from about 95 percent to about 60 percent, by weight, of the anionic, water-dispersible, non-gelled, acrylic resin which is heat reactive with either or both of said cross-linking agents, based on the total weight of said acrylic material and cross-linking agent. It should be apparent that all of the above percentages, by weight, will total 100 percent, by weight, and are based on the total solids weight of the guanamine or melamine and said acrylic resin. It is preferred to use between about 10 percent to about 30 percent, by weight, of the guanamine or melamine and, correspondingly, from abou 90 percent and 70 percent, by weight, of the said acrylic resin, same basis. In no case should more guanamine or melamine be tolerated than will react with more than about 80 percent of the available carboxyl or hydroxyl groups of the acrylic resin.

Subsequent to electrodeposition, the coated substrate is preferably washed with water and is, thereafter, heat cured under known conditions of temperature to form a well-bonded, hard coating of the acrylic resin and melamine or guanamine cross-linking agent. Thus, the resultant electrocoated substrate is rendered highly susceptible to good contact and bondability with adhesives.

Resultant cured coating is then ready for contact with an adhesive, such as an epoxy adhesive, for purposes of bonding metals thereto. Any resin adhesive known in the art can be utilized for this purpose with such materials as nitrile modified epoxy adhesives, polyurethane based adhesives, and other commercially available or otherwise well-known adhesive systems, those useful being of such multitudes so as to render specific enumeration thereof herein virtually impossible. It should suffice to say that all adhesives may be used, the specific material forming no part of the present invention.

The following examples are set forth for purposes of illustration only and are not to be construed as limitations on the present invention except as set forth in the appended claims. All parts and percentages are by weight unless otherwise specified.

EXAMPLES 1-9

To a suitable electrodeposition tank are added 125 parts of the carboxyl group-containing acrylic resin solution produced as specified hereinabove, 30 parts of a mixed methyl and ethyl ether of hexamethylol melamine, 70 parts of resorcinol digylcidyl ether, 3 parts of diethylamine, and 842 parts of water. A 0.02 inch thick panel of aluminum is used as the electrode to be coated with the so-modified acrylic resin. The aluminum panel is connected with the anode of a Ransburg Power Supply 500 AB, 0–500 volts, 0–10 amperes. A steel panel serves as the cathode. The aluminum and steel panels are immersed in the emulsion of acrylic resin, fully etherified methyl melamine while continuous agitation is initiated. A voltage of 100 volts is then applied for 1 minute. The aluminum panel is removed and the electrodeposited coating is rinsed with water. The coating is then cured at about 165° C. for one hour. A second panel is next prepared in the same manner and the two panels are then bonded together with a commercially available nitrile modified epoxy adhesive. The peel strength of the resultant laminate is then determined as set forth in ASTM-D-1876-69.

The results of the laminate prepared in above are set forth in Table I, below, along with results recorded utilizing different acrylic resins, bis-ureas or epoxy compounds, and cross-linking agents.

TABLE 1

| Example | Acrylic resin | Cross-linking agent | Bis-urea or epoxy resin compound | Peel strength (p.p.i.) |
|---|---|---|---|---|
| 1 | Same as Example 1 | Same as Example 1 | Same as Example 1 | 40–46 |
| 2 | do | do | None | 2–46 |
| 3 | do | do | 20% 1,1'-ethylenediurea | 35–40 |
| 4 | do | do | 30% 1,1'-(4-methyl-m-phenylene)-bis-[3,3-diisopropylurea]. | 42–50 |
| 5 | Same as Example 1 except acrylamide used in place of acrylonitrile. | do | Same as Example 1 | 38–48 |
| 6 | Same as Example 1 except fumaric acid used in place of acrylic acid. | 45 parts of tetrakis (methoxymethyl) benzoguanamine. | 10% 1,1'-trimethylenebis [3,3-diethylurea]. | 40–45 |
| 7 | Same as Example 1 except that 50% of butyl acrylate replaced by styrene. | 55 parts of bis (ethoxymethyl) bis (methoxymethyl) benzoguanamine. | Same as Example 1 | 36–44 |
| 8 | Same as Example 1 except acrylonitrile replaced by α-chlorostyrene. | 25 parts of bis (butoxymethyl) bis (methoxymethyl) guanamine. | do | 42–47 |
| 9 | Same as Example 1 except that 2-hydroxyethyl acrylate replaced by methylolacrylamide. | Same as Example 1 | do | 38–42 |

I claim:

1. An article comprising a self-supporting metal substrate having thereon a heat-curable, adhesively bondable, electrodeposited coating of a mixture of a substantially fully etherified tetramethylol guanamine, a water-insoluble acrylic resin having an acid number of at least about 20, and from about 1 percent to about 50 percent of a bis-urea compound, based on the weight of said acrylic resin, said article being produced by: (A) electrodepositing onto a metal substrate, from an emulsion thereof, a mixture of (I) a water-dispersible, non-gelled, acrylic film-forming resin carrying an anionic charge and having an acid number of at least about 20 (II) sufficient substantially fully etherified hexamethylol melamine or substantially fully etherified tetramethylol guanamine to react with at least about 5 percent of the groups in said (I) reactive with (II), and (III) from about 1 percent to 50 percent of bis-urea compound, based on the weight of (I), and (B) recovering the resultant coated substrate and removing excess emulsion therefrom, said bis-urea having the structure

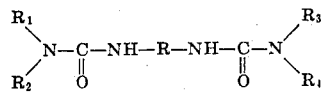

wherein

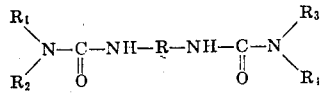

wherein R is lower alkylene or arylene; $R_1$, $R_2$, $R_3$, and $R_4$ are each hydrogen, lower alkyl, or phenyl.

2. An article according to claim 1 wherein said bis-urea is 1,1'-(4-methyl-m-phenylene)-bis [3,3-diisopropylurea].

3. An article according to claim 1 wherein said bis-urea is 1,1'-ethylenediurea.

* * * * *

UNITED STATES PATENT OFFICE
CERTIFICATE OF CORRECTION

Patent No. 3,755,119   Dated August 28, 1973

Inventor(s) Gerhard Josef Pietsch

It is certified that error appears in the above-identified patent and that said Letters Patent are hereby corrected as shown below:

Column 1 line 65   "malamine" should read -- melamine --.
Column 2 line 17   "malamine" should read -- melamine --;
Column 2 line 30   "meium" should read -- medium --; Column 2 line 31   "malamine" should read -- melamine --.
Column 4 line 36 "Z" should read "$\underline{Z}$".   Column 7 line 30 "]3,3-" should read -- [3,3- --; Column 7 line 38 "5 percent" should read -- 50 percent --.   Column 10 line 5 Example 2 Peel strength "2-46" should read -- 2-4 --.

Signed and sealed this 19th day of February 1974.

(SEAL)
Attest:

EDWARD M. FLETCHER, JR.
Attesting Officer

C. MARSHALL DANN
Commissioner of Patents

UNITED STATES PATENT OFFICE
CERTIFICATE OF CORRECTION

Patent No. 3,755,119      Dated August 28, 1973

Inventor(s) GERHARD JOSEF PIETSCH

It is certified that error appears in the above-identified patent and that said Letters Patent are hereby corrected as shown below:

Column 9 line 20. After "a mixture of a" insert -- substantially fully etherified hexamethylol melamine or --.

Signed and sealed this 8th day of October 1974.

(SEAL)
Attest:

McCOY M. GIBSON JR.
Attesting Officer

C. MARSHALL DANN
Commissioner of Patents